US007403926B2

(12) United States Patent
Herbert

(10) Patent No.: US 7,403,926 B2
(45) Date of Patent: Jul. 22, 2008

(54) MAIL PREPARATION SYSTEM

(75) Inventor: Raymond John Herbert, Leigh-on-Sea (GB)

(73) Assignee: Neopost Limited, Romford, Essex (GB)

(*) Notice: Subject to any disclaimer, the term of this patent is extended or adjusted under 35 U.S.C. 154(b) by 0 days.

(21) Appl. No.: 10/087,797

(22) Filed: Mar. 5, 2002

(65) Prior Publication Data

US 2002/0087493 A1 Jul. 4, 2002

Related U.S. Application Data

(63) Continuation of application No. 09/421,947, filed on Oct. 21, 1999.

(30) Foreign Application Priority Data

Oct. 23, 1998 (GB) ................................ 9823288.7

(51) Int. Cl.
*G06F 9/00* (2006.01)

(52) U.S. Cl. ...................................................... 705/410

(58) Field of Classification Search ................. 705/410, 705/408, 407, 403, 404, 62, 401, 30, 405; 101/91; 235/375, 494; 380/51; 53/147; 358/1.14; 400/225, 62
See application file for complete search history.

(56) References Cited

U.S. PATENT DOCUMENTS

| | | | | |
|---|---|---|---|---|
| 4,253,014 | A * | 2/1981 | Woodbine | 235/92 AC |
| 4,535,419 | A * | 8/1985 | Dlugos et al. | 364/900 |
| 4,796,193 | A * | 1/1989 | Pitchenik | 364/464.02 |
| 4,962,459 | A * | 10/1990 | Mallozzi et al. | 364/464.02 |
| 5,319,562 | A * | 6/1994 | Whitehouse | 364/464.03 |
| 5,452,654 | A | 9/1995 | Connell et al. | |
| 5,477,462 | A * | 12/1995 | McClung | 364/464.02 |
| 5,648,906 | A * | 7/1997 | Amirpanahi | 364/464.28 |
| 5,655,023 | A * | 8/1997 | Cordery et al. | 380/51 |
| 5,731,980 | A * | 3/1998 | Dolan et al. | 364/464.2 |
| 5,749,078 | A * | 5/1998 | Gargiulo et al. | 705/404 |
| 5,768,132 | A * | 6/1998 | Cordery et al. | 705/410 |
| 6,227,445 | B1 * | 5/2001 | Brookner | 235/379 |
| 6,285,990 | B1 * | 9/2001 | Lee et al. | 705/60 |

(Continued)

FOREIGN PATENT DOCUMENTS

EP 0741374 11/1996

(Continued)

OTHER PUBLICATIONS

Office World News, Postage Downloads Introduced, May 1998.*

(Continued)

*Primary Examiner*—Hani Kazimi
*Assistant Examiner*—Olabode Akintola
(74) *Attorney, Agent, or Firm*—Shoemaker and Mattare

(57) ABSTRACT

In a method of preparation of a series of mail items in which postal indicia are printed on the mail items when creating an indicium for a mail item after the first mail item, a determination is made as to whether an indicium created for a previous mail item in the series has not been used for example because the mail item was spoiled or removed. If a previously prepared indicium remains unused, a substitute indicium is created. The substitute indicium is a modification of the unused indicium and contains an indication that it is a substitute indicium.

12 Claims, 4 Drawing Sheets

U.S. PATENT DOCUMENTS

| | | | | |
|---|---|---|---|---|
| 6,385,504 | B1 * | 5/2002 | Pintsov et al. | 700/226 |
| 6,415,336 | B1 * | 7/2002 | Sansone | 710/5 |

FOREIGN PATENT DOCUMENTS

| | | | |
|---|---|---|---|
| EP | 0782109 | | 7/1997 |
| EP | 0814434 | | 12/1997 |
| WO | WO 98/57303 | * | 6/1998 |

OTHER PUBLICATIONS

Business Wire, Neopost Introduces Internet-Based Postage Metering System for the Small Office/Home Office Market, Mar. 1998.*

* cited by examiner

MAIL PREPARATION SYSTEM

This application is a continuation of application Ser. No. 09/421,947, filed Oct. 21, 1999.

BACKGROUND OF THE INVENTION

This invention relates to the preparation of mail items and to providing evidence of accounting for postal charges in relation the mail items and in particular to providing evidence of accounting for postal charges in respect of a sequence of mail items when a mail item is withdrawn from preparation of the sequence of mail items.

When using known postage meters to account for postage charges in respect of mail items, accounting for the postage charges is effected prior to the printing of a postage imprint on the mail item. The postage imprint indicates that accounting for the postage charges has taken place in the postage meter. A mail item may become spoiled or damaged after a postage charge for the mail item has been accounted for by the postage meter, for example the mail item may be damaged during or after the printing of the postage imprint. Also a sender of mail may decide not to despatch a specific mail item that has been processed by the postage meter. In these instances accounting for a postage charge in respect of the spoiled or removed item has been effected and then it is necessary to go through a refund procedure with the postal authority in order to obtain a refund of the postage charge in respect of mail items which are not entered into the postal system. Usually the mail sender is required to present the spoiled or otherwise withdrawn mail when making a request for a refund. This procedure is inconvenient and is time consuming for the mail sender.

Accordingly it is desired to provide a method wherein an accounting for postage charges in respect of a specific mail item that has been withdrawn can be utilised in respect of a later mail item in a series of mail items in a manner that is secure and enables fraud to be detected.

SUMMARY OF THE INVENTION

According to a first aspect of the invention a method of mail preparation includes the steps of:

processing a first mail item comprising a mail item in a series of mail items;

effecting an accounting operation in respect of a first amount of a postage charge for said first mail item;

generating a first postage indicium to provide evidence that said accounting operation has been effected in respect of said first amount of the postage charge;

processing a second mail item comprising a mail item subsequent to said first mail item in said series of mail items;

determining if said amount of said postage charge remains unused because processing of said first mail item was not completed;

determining if said first postage indicium is suitable for use in relation to said second mail item; and if the first postage indicium is suitable for use in relation to said second mail item, modifying said first postage indicium to provide evidence that said accounting operation has been effected in respect of said first amount of postage charge and if the first postage indicium is not suitable for use in relation to said second mail item, effecting an accounting operation in respect of a second amount of a postage charge for said second mail item;

generating a second postage indicium to provide evidence that said accounting operation has been effected in respect of said second of the postage charge.

According to a second aspect of the invention mail preparation apparatus includes:

accounting means operable to effect an accounting operation in respect of a first postage charge for a first mail item of a series of mail items and to generate a first postage indicium to provide evidence that said accounting operation has been effected in respect of said first postage charge;

said accounting means being operative in processing a second mail item comprising a mail item subsequent to said first mail item in said series of mail items to determine if said postage charge remains unused because processing of said first mail item has not been completed and if said first postage is unused to determine if said first postage indicium is suitable for use in relation to said second mail item; and if the first postage indicium is suitable for use in relation to said second mail item, to generate a substitute postage indicium to provide evidence in relation to said second mail item that said accounting operation has been effected in respect of said first postage charge and if the first postage indicium is not suitable for use in relation to said second mail item, to effect an accounting operation in respect of a second postage charge for said second mail item and to generate a second postage indicium to provide evidence that said accounting operation has been effected in respect of said second postage charge.

BRIEF DESCRIPTION OF THE DRAWING

An embodiment of the invention will now be described by way of example with reference to the drawings in which.

DESCRIPTION OF THE PREFERRED EMBODIMENT

Figure 1:
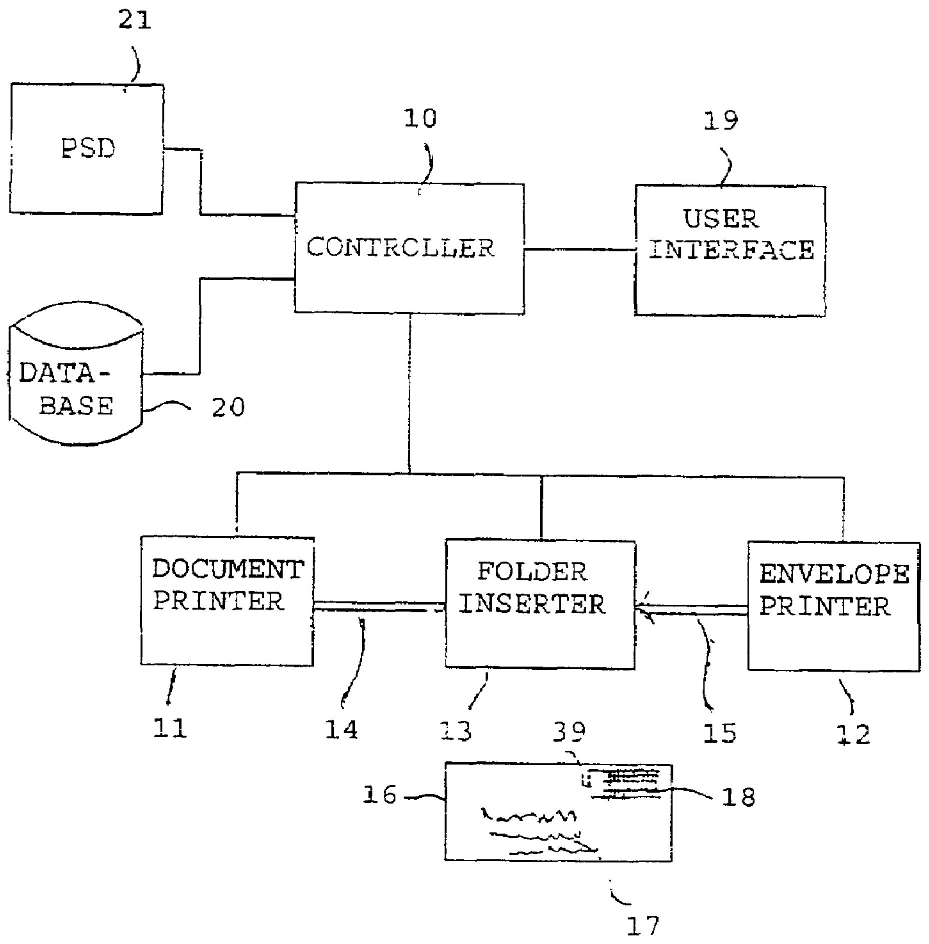
FIG. 1 is a block diagram of a mail preparation system.

Referring first to FIG. 1 a mail preparation system for preparing a series of mail items comprises a controller or host 10, for example a personal computer, which controls operation of a document printer 11, an envelope printer 12 and a folder inserter 13. The controller 10 outputs signals to the document printer 11 to print one or more document sheets and outputs signals to the envelope printer 12 to print a recipient address and postal imprint on an envelope for each of a series of mail items to be prepared. A mechanical sheet transport 14 carries the printed document sheets for a mail item from the document printer 11 to the folder inserter 13 and a mechanical transport 15 carries an envelope printed by the envelope printer 12 with a recipient address and postal imprint to the folder inserter 13. Preferably the mechanical transports 14, 15 provide mechanical buffering of sheets and envelopes respectively to enable the required merging of document sheets with corresponding envelopes in the folder inserter 13. The folder inserter 13 folds the document sheets, if required, inserts the document sheets in the corresponding envelope, seals the envelope and outputs a completed mail item 16 bearing the recipient address 17 and postage indicium imprint 18.

A user interface 19 is provided for the controller 10 whereby a user is enabled to operate the controller, for example by means of a keyboard of the interface, and the interface includes a display for displaying information relating to operation of the system to the user.

A database 20 is connected to the controller 10 for the purpose of providing recipient address data to the controller whereby the addresses of intended recipients of mail selected by input from the user interface to the controller are read from the database and are output by the controller to the envelope printer 12 to effect printing of the recipient addresses on the envelopes.

Accounting for postage charges and generation of postage imprints in respect of mail items is carried out by a postage secure device (PSD) 21 connected to the controller. The PSD is housed in a secure housing. The PSD 21 may be mounted internally of the controller or may be located externally of the controller and connected to an input/output port of the controller 10. A digital postage imprint or indicium may be generated in the PSD and output to the controller 10 or alternatively the PSD may output a digital token to the controller and the controller generates a postage imprint including the digital token.

Figure 2:
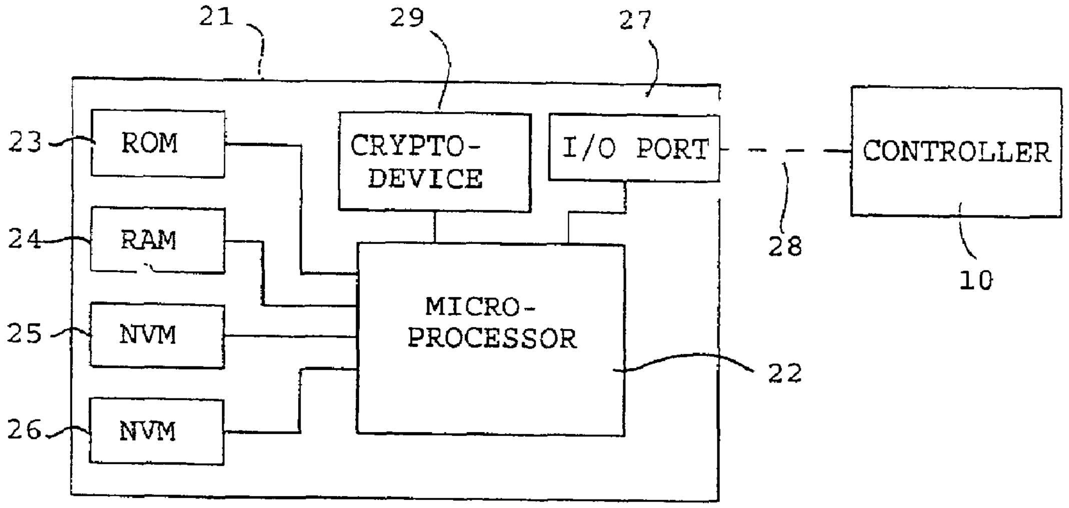
FIG. 2 is a block diagram of a postal secure device (PSD) of the mail preparation system.

Referring now to FIG. 2, the postage secure device (PSD) 21 includes electronic accounting and control means comprising a micro-processor 22 operating under program routines stored in a read only memory (ROM) 23 A random access memory (RAM) 24 is provided for use as a working store for storage of temporary data during operation of the PSD. Non-volatile duplicated memories 25, 26 are provided for the storage of critical data relating to use of the PSD meter and which is required to be retained even when the PSD is not powered. The microprocessor 22 carries out accounting functions in relation to dispensing of postage charges by the PSD in respect of mail items prepared by the mail preparation system. Accounting data relating to operation of the PSD in dispensing postage charges is stored in the non-volatile memories 25, 26. The accounting data includes a value of credit, an accumulated total of value postage charges dispensed by the PSD, a count of the number of mail items processed. If desired a count of the number of mail items for which a postage charge in excess of a predetermined value has been dispensed. The value of credit may be a value of credit available for use by the PSD and stored in a descending credit register. The accumulated total value of postage charges dispensed is stored in an ascending tote register, the count of items is stored in a piece count register and the count of items franked with a postage charge in excess of a predetermined value is stored in a large items register. Alternatively, if desired, instead of a descending register storing a value of credit available for use by the meter, a total value of credit entered into the meter may be stored in an ascending credit register.

As is well known in the postage meter art, each of the registers referred to hereinbefore for storing accounting data is replicated in order to enable integrity of the accounting data to be maintained even in the event of a fault or termination of power to the PSD during a mail preparation operation. Two replications of each of the registers are provided in each of the memory devices 25, 26.

The PSD 21 includes an I/O port 27 for communication via a communication link 28 with the controller 10. The I/O port 27 may include connections for the supply of electrical power from the controller 10 to provide electrical power to the circuits of the PSD. Alternatively the PSD may receive electrical power from a separate mains powered power supply unit (not shown). The PSD also includes a crypto-device 29 operable to carry out cryptographic operations in respect of data.

When a mail item is to be prepared, data relating to the information content of one or more documents to be included in the mail item is input by the user interface 19 to the controller 10. A recipient address for the mail item is read out from the database 20 in response to input by the user interface of a code or the like identifying an address stored in the database 20. The controller 10, having received information for the preparation of documents to be included in the mail item and therefore having information as to the make-up of the mail item, that is to say the number of sheets to be included in the item, calculates the weight of the intended mail item. From the recipient address information and the weight of the intended mail item the controller operates to calculate a required postage charge for the item. Alternatively the user interface may input either or both of the recipient address and postage charge for the mail item to the controller 10. The controller outputs the required postage charge in an indicium request to the PSD 21.

Figure 3:
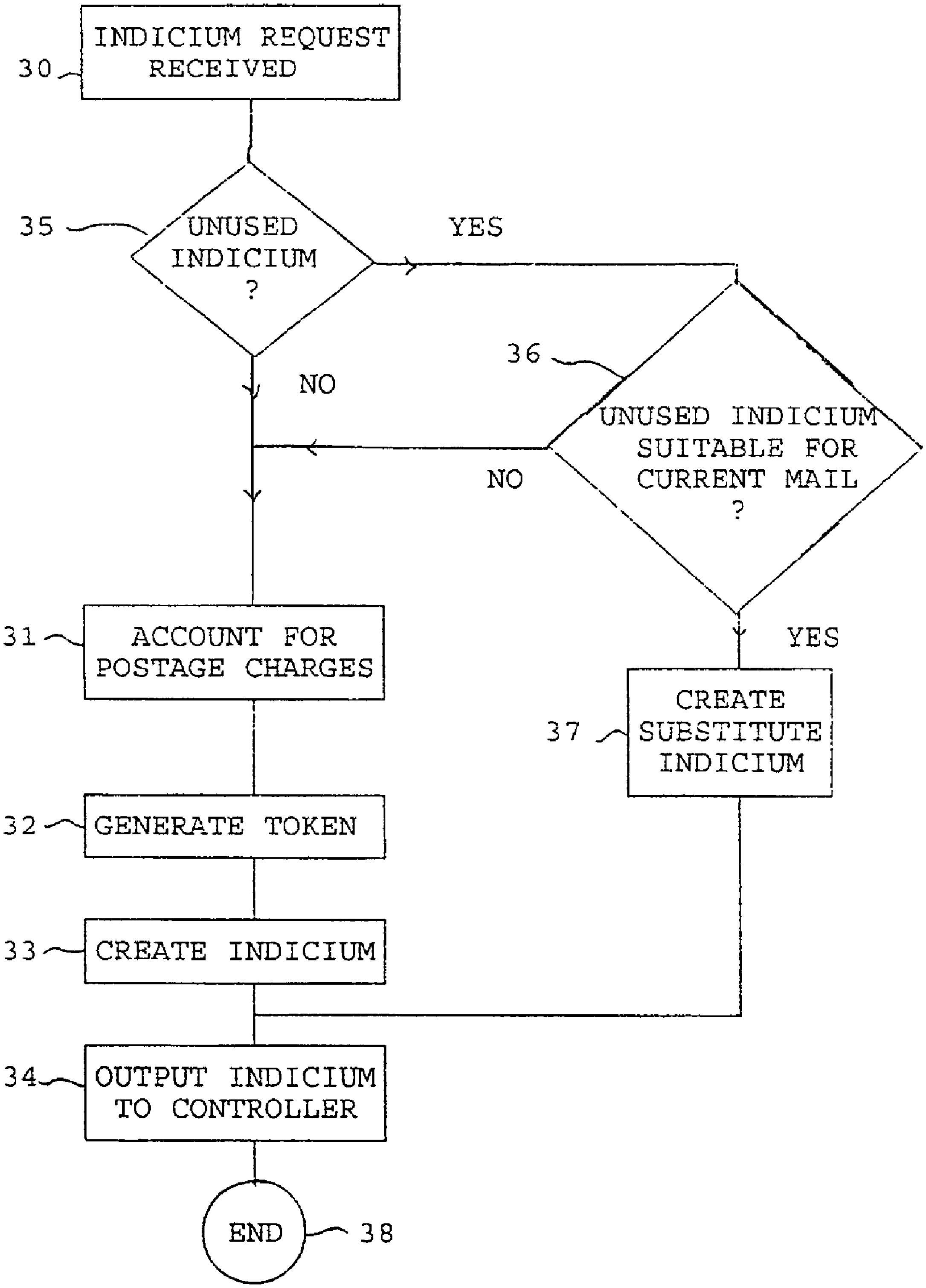
FIG. 3 is a flow diagram illustrating a method of creating a postage indicium for a mail item by the PSD.

Referring now to FIG. 3, upon receipt (step 30) of the indicium request, the microprocessor 22 of the PSD carries out an accounting operation (step 31) in which the stored values of credit and dispensed postage charges in NVMs 25, 26 are adjusted in accordance with the required postage charge and the items count in NVMs 25, 26 is incremented by one.

The microprocessor 22 outputs to the crypto-device 28 data which the crypto-device operates on to generate (step 32) a cryptographic message or token. The data output by the microprocessor 22 to the cryptographic device 28 includes at least the postage charge for the mail item and an identification of the PSD 21 and in addition may include one or more of date of mail preparation, the credit register value, the tote register value, items count. The crypto-device 28 operates on the data input thereto by the microprocessor 22 to generate a cryptographic token relating to the mail. The cryptographic token may be an encryption of the data input or may be a digital signature based on the data input to the crypto-device.

The PSD 21 creates (step 33) a postage indicium relating to the mail item which comprises a plain text message and the cryptographic token. The plain text message includes at least the postage charge for the mail item and enabling information to enable either decryption of the cryptographic token where a reversible encryption and decryption process is used or verification of the cryptographic token where the cryptographic token comprises a digital signature. The cryptographic token provides authentication of the plain text in the postage indicium whereby the veracity of the postage indicium may be verified by a postal authority. The enabling information includes an identification of the PSD and may include a public cryptographic key associated with the PSD for use in the verification procedure. The postage indicium created by the PSD is output (step 34) to the controller 10 which in turn outputs the postage indicium, together with recipient address information to the envelope printer 12. The envelope printer 12 is operated to print a postage indicium imprint 18 and the recipient address 17 on the envelope.

It will be appreciated that security for the postage indicium is predicated upon ensuring that each cryptographic token created in the PSD is different from all other cryptographic tokens created. It is likely that the postage charge data may be the same for a large number of mail items and hence, in addition to the postage charge for an item, data items which change for each mail item are included in the cryptographic process so that the cryptographic token comprising the encryption or the digital signature is based on the postage charge and on data items which change for each mail item. Hence the cryptographic token created is unique for each mail item.

In a mail preparation system as described with reference to FIG. 1, the postage indicium and the cryptographic token included therein is created for a mail item prior to completion of physical preparation of the mail item. Accordingly, if there is a mal-function of the printers 11, 12, of the folder-inserter 13 or of the mechanical transports 14, 15 resulting in a spoiled mail item, accounting for a postage charge for the spoiled mail item and creation of the cryptographic token will have occurred in the PSD and yet the spoiled mail item will be withdrawn and not entered into the postal system. Also a user may wish to withdraw a completed mail item, or a mail item in preparation, from the mail preparation system.

When a physical mail item is withdrawn from the mail preparation system, i.e the mail item is withdrawn subsequent to creation of a postage indicium including a cryptographic token relating to that mail item, the user interface 19 is used to input a signal to the controller 10 indicating that an item has been withdrawn and the controller sends a message to the PSD indicating that the postage indicium relating to that withdrawn mail item has not been utilised. During preparation of each mail item, after receipt of the indicium request, the microprocessor 22 of the PSD carries out a routine to determine (step 35) if any of the postage indicia created in the PSD have been unused. If there are no unused postage indicia (NO output of step 35) the microprocessor 22 proceeds to carry out accounting in respect of the current mail item (step 31). If there is an unused postage indicium (YES output of step 35) the microprocessor 22 determines (step 36) if the unused postage indicium including a cryptographic token is suitable for use in relation to the current mail item. For example, the postage indicium is suitable for use if the postage charge for the current mail item is the same as the postage charge dispensed in respect of the withdrawn mail item. If the unused postage indicium is suitable for use in relation to the current mail item, the microprocessor generates a substitute postage indicium including a cryptographic token (step 37) but, since accounting has already been carried out during the original creation of the postage indicium, without carrying out any accounting. After output of the indicium to the controller (step 34) the routine ends (END 38).

In determining if a postage indicium created for a spoiled mail item is suitable for use in relation to a subsequent mail item, one factor to be determined is whether the postage charge of the unused indicium is equal to that required for the current item. If the postage charges are equal, the postage indicium may be re-issued as a substitute postage indicium. While the determination could be decided only upon the postage charge for the current item being the same as that for the spoiled or removed item it is preferred that the determination is made upon other factors as well. Usually if a mail item is spoiled, it will be desired to generate a replacement mail item in the same mail preparation run and hence determination of suitability preferably depends upon the dates of mail preparation being the same as well as the postage charges being equal. The postage indicia may include information relating to recipient address for the corresponding mail item whereby each postage indicium is unique to a specific mail item. If the recipient address is included in the postage indicia, the information input to the crypto-device 29 may include recipient address information so that the cryptographic token is based additionally on the recipient address information. When recipient address information is included in the postage indicium, it will be appreciated that suitability of an unused postage indicium including a cryptographic token for re-issue as a substitute postage indicium including a cryptographic token is additionally dependent upon the recipient address of the later mail item being the same as that of the spoiled or removed item. Thus when a mail item is spoiled or removed and the postage indicium includes recipient address information, the postage indicium and cryptographic token are suitable for use only in relation to a mail item created as a replacement for the spoiled or removed mail item.

It will be appreciated, where a mail item is withdrawn after printing of the postage indicium on the envelope, that re-creation of the postage indicium in its original form would result in the printing of two identical postage indicia for which only a single postage charge has been accounted by the PSD. The printing of identical postage indicia may lead to reduction in the security of postage indicia and hence to an increased possibility of fraud being effected. In order to avoid this possible reduction in security, the substitute postage indicium produced for the current later mail is modified relative to the postage indicium created for the withdrawn mail item so as to be distinguishable from the postage indicium created for the withdrawn mail item. Accordingly each postage indicium includes a flag and the state of the flag is indicative of whether the postage indicium is an originally created indicium for which accounting has been effected or a substitute postage indicium, for which no accounting has been effected, substituted for an originally created indicium for which accounting has been effected.

The postage indicium imprint may include visually readable information and machine readable information, the cryptographic token being included in the machine readable information. The postage indicium imprint includes a flag region 39 constituting the flag and the state of the flag is indicative of whether the postage indicium is an original indicium or a substitute postage indicium. Preferably in an original postage indicium imprint the flag has a first state in which the flag region 39 remains unprinted whereas in a substitute postage indicium the flag has a second state and the flag region 39 is printed.

Preferably the flag region is included as a part of the machine readable information but if desired a flag may also be printed in the visually readable part of the imprint. The machine readable part of the postage indicium imprint 18 may be in the form of a matrix of pixels having either one of two values. The flag region may comprise a group of one or more pixels of the imprint. It is to be understood that the flag region 39 and the postage indicium imprint shown in FIG. 1 is illustrative only to indicate the presence of a flag region and postage indicium imprint and is not to be understood as in any way limiting the form of the flag or the postage indicium imprint.

Figure 4:
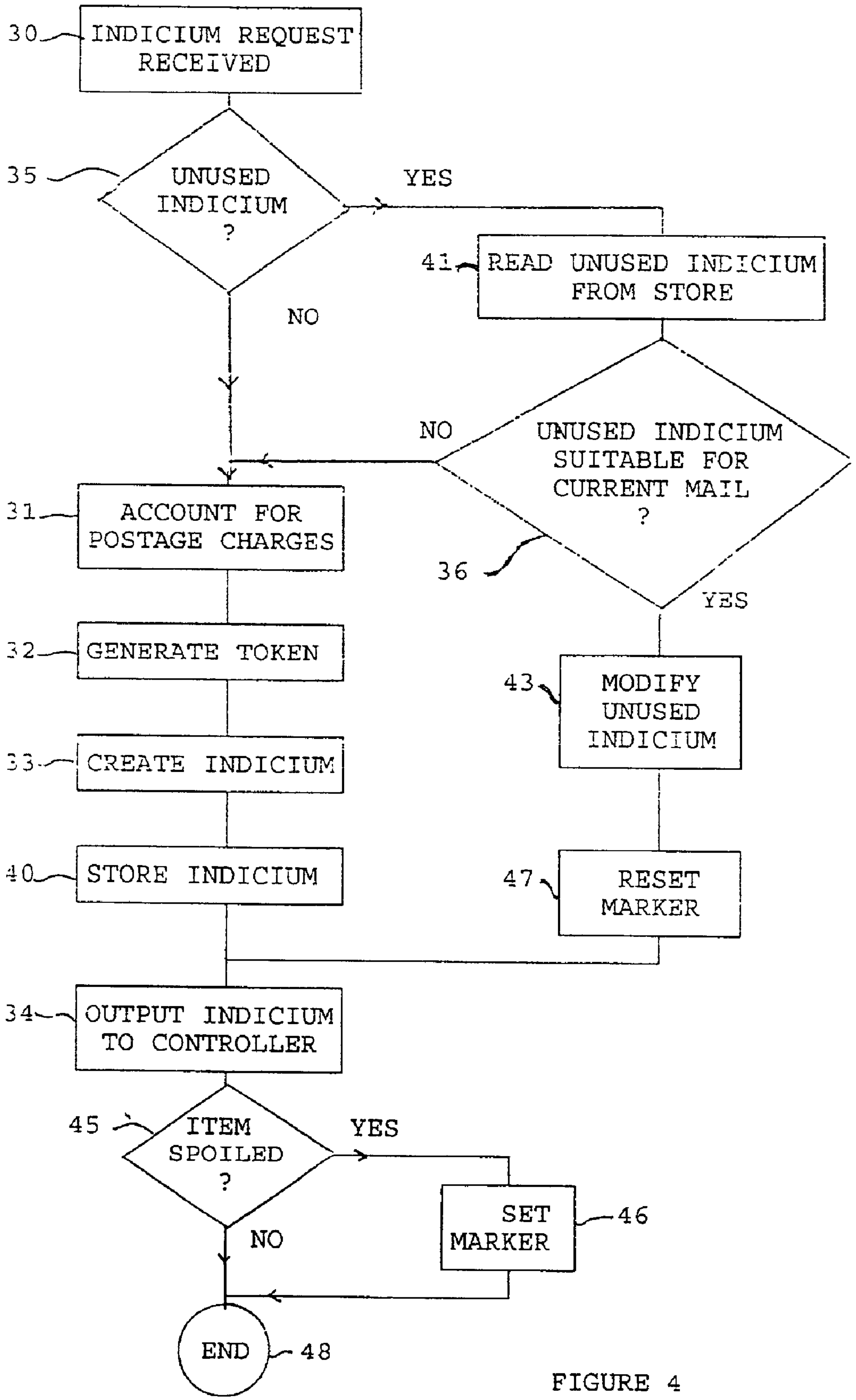
FIG. 4 is a flow diagram illustrating an alternative method of creating a postage indicium for a mail item.

By providing a substitute postage indicium including a cryptographic token that is distinguished from a corresponding original postage indicium including a cryptographic token, a postal authority may be alerted to the fact that a substitute postage indicium including a cryptographic token has been issued and take special measures to detect if a mail item bearing the original postage indicium has also been entered into the postal system. It is to be understood that, apart from the state of the flag, the information contained in the substitute postage indicium is the same as that included in the original postage indicium and hence the cryptographic token would be the same as the token of the original postage indicium. Accordingly if desired as illustrated in FIG. 4, instead of creating the substitute postage indicium including the cryptographic token as described hereinbefore, the postage indicia together with the corresponding cryptographic tokens may be written to and stored (step 40) in a storage location in non-volatile memories 25, 26 to provide a trail of postage indicia including cryptographic tokens generated in the PSD. If after generation of a postage indicium including a cryptographic token the corresponding mail item is subsequently removed (YES output of step 45) from the mail preparation system a marker is set (step 46) to indicate that the postage indicium including cryptographic token created for the removed mail item has not been used. Then in processing subsequent mail items, the marked unused postage indicium and token are read out (step 41) to determine (step 36) whether the postage indicium and token is suitable for use in relation to the current mail item. If the postage indicium including token is suitable for use (YES output of step 36) in relation to the current mail item, the state of the flag in the postage indicium is reversed (step 43) to produce the substitute postage indicium including a cryptographic token and the state of the marker of the postage indicium stored in NVM is also reset (step 47). The substitute indicium and token are output (step 34) to the controller 10 and the routine ends (END 48).

If in the determination step 36, the unused postage indicium is determined to be unsuitable for use (NO output of step 36) in relation to the current mail item, the routine returns to the input of step 31 and effects an accounting procedure followed by generation of a cryptographic token (step 32) and indicium (step 33) and storing (step 40) of the indicium including the cryptographic token.

Figure 5:
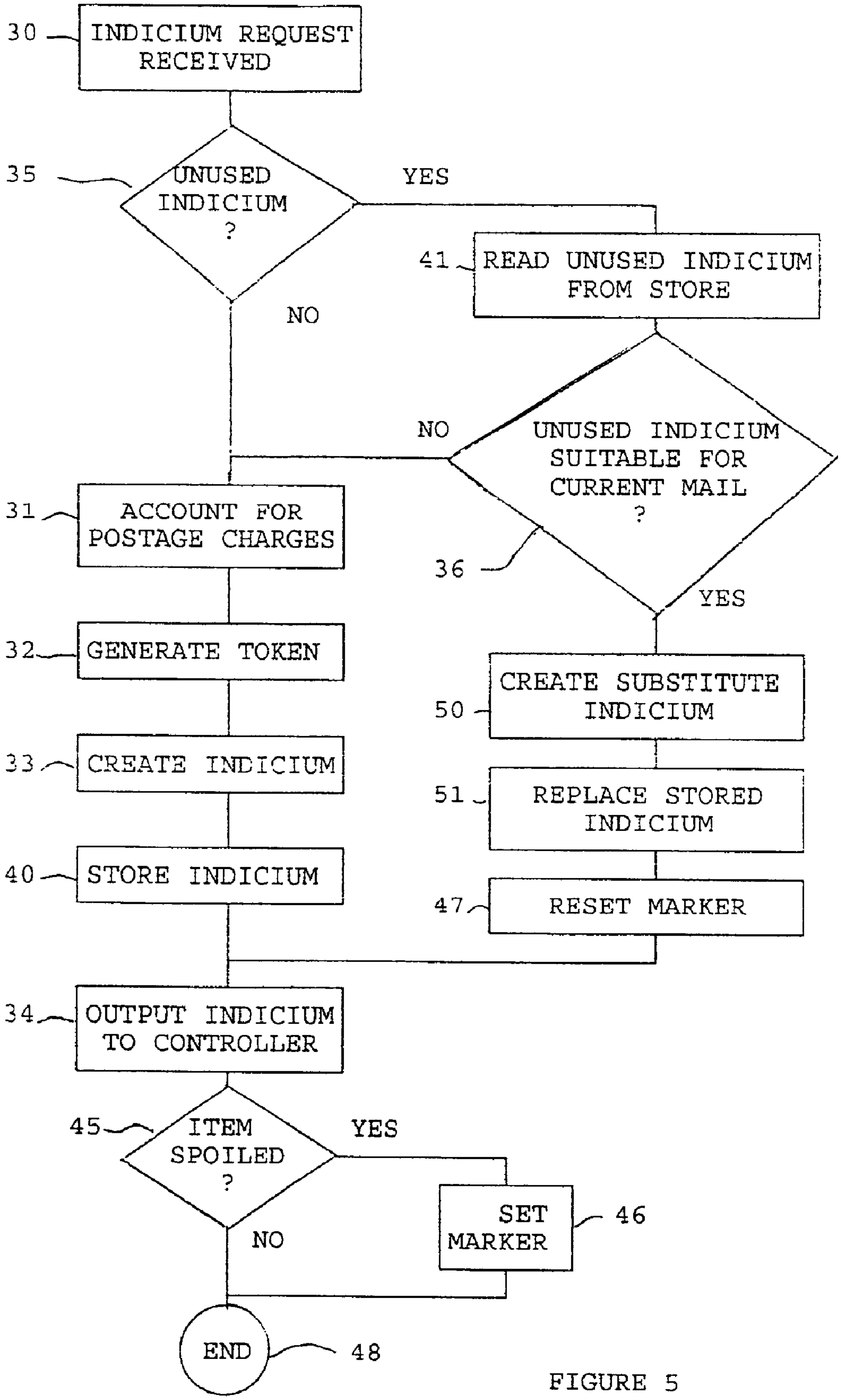
FIG. 5 is a flow diagram illustrating a modification of the method illustrated by FIG. 4.

If desired, the state of the flag in the imprint 18 may be included in information that is encrypted by the crypto-device or in information on which the digital signature is based in which case the cryptographic token included in the substitute postage indicium differs from the cryptographic token included in the original postage indicium. With the cryptographic token being dependent upon the state of the flag, any attempt to corrupt the imprint of the flag will be indicated by absence of verification by the cryptographic token of the postage indicium. It will be appreciated that if the cryptographic token is dependent upon the state of the flag, it will be necessary to generate a new cryptographic token for inclusion in the substitute postage indicium and hence to modify the routine of the flow chart of FIG. 4 to that shown in the flow chart of FIG. 5. The postage indicia including cryptographic tokens may be stored and the postage indicia is read out, as in step 41 of FIG. 4, from the store to determine whether or not the postage indicium is suitable for use in relation to the current mail item. If the postage indicium is suitable for use in relation to the current mail item, the state of the flag is reversed and a new cryptographic token is generated to create a substitute indicium (step 50). The original postage indicium and cryptographic token in NVM are then replaced by the substitute postage indicium including the new cryptographic token (step 51).

While a flag having two states is sufficient to indicate that a postage indicium is an original postage indicium or a substitute postage indicium, if desired a more complex indication providing additional information may be provided. Furthermore if desired the visually readable part of a substitute postage indicium may include a clearly visible indication, such as the word "DUPLICATE" so that it is clearly evident to a person checking mail that a substitute postage indicium has been printed. If desired, where more than one mail item is spoiled, or a substitute mail item itself is spoiled, and hence more than one substitute postage indicium is printed, the indicia may include indications of the number of substitute indicia issued and the visually readable parts of the indicia may for example include numbered indications such as "1st DUPLICATE", "2nd DUPLICATE" respectively. The PSD may include a storage location in NVM which stores a count of substitute indicia issued and the content of this storage location may be read (step) and used to determine (step) the numbered indication included in each substitute postage indicium.

The provision of a flag indicating that a postage indicium is a substitute indicium permits a postal service to determine the occurrence of such substitute indicia. The provision of visually readable numbered indications of the number of substitute indicia issued facilitates determination of the number of occurrences of printing of substitute indicia by visual inspection of mail by postal service personnel. Abnormally high occurrences of spoiled mail would be easily detectable and thereby facilitate investigation for the possibility of fraud.

While hereinbefore, the invention has been described as being utilised in a relatively complex mail preparation system in the event of one or more mail items being spoiled or removed from the system, it is to be understood that the invention may also be utilised in digital franking machines and PC based franking systems where accounting for a postage charge is effected prior to or concurrently with printing of a postage indicium on a mail item. If the mail item is spoiled, for example the mail item is physically damaged in being transported past a print head or the printing of the postage indicium is defective, the invention permits the re-issue of the postage indicium and token to a substitute mail item in which the accounting for postage charge carried out in respect of the original spoiled mail item is utilised in relation to the substitute postage imprint and token.

I claim:

1. A method of mail preparation, including the steps of:

processing a first mail item comprising a mail item in a series of mail items;

effecting an accounting operation in respect of a first postage charge for the first mail item, and generating a first postage indicium to provide evidence that the accounting operation has been effected in respect of the first postage charge;

processing a second mail item comprising a mail item, subsequent to the first mail item, in the series of mail items;

determining whether the first postage charge remains unused, with the first postage charge remaining unused when processing of the first mail item has not been completed;

where the first postage charge is unused, determining whether the first postage indicium is suitable for use in relation to the second mail item;

where the first postage indicium is suitable for use in relation to the second mail item, generating a substitute postage indicium to provide evidence in relation to the second mail item that the accounting operation has been effected in respect of the first postage charge, wherein the step of generating a substitute postage indicium includes the step of providing an indicator in the first postage indicium indicative that the accounting operation for the first postage charge relates to the second mail item; and where the first postage indicium is not suitable for use in relation to the second mail item, effecting an accounting operation in respect of a second postage charge for the second mail item, and generating a second postage indicium to provide evidence that the accounting operation has been effected in respect of the second postage charge.

2. A method as claimed in claim 1 wherein the substitute postage indicium includes a cryptographic token and the cryptographic token is based in part upon the indicator.

3. A method as claimed in claim 1, wherein the first postage indicium is generated to include a flag in a first state, and the substitute postage indicium is generated with the flag in a second state different from the first state.

4. A method as claimed in claim 3, wherein the substitute postage indicium includes a cryptographic token and the cryptographic token is based in part upon the state of the flag.

5. A method as claimed in claim 1, wherein the step of generating the first postage indicium is based at least in part on a recipient address, and the step of determining whether the first postage indicium is suitable for use in relation to the second mail item includes the step of determining whether the recipient address of the second mail item is the same as the recipient address of the first mail item.

6. A method as claimed in claim 1, further including the steps of:

storing the first postage indicium and a marker relating to the stored first postage indicium; and setting the marker where processing of the first mail item is not completed.

7. A method as claimed in claim 6, further including the step of:

resetting the marker relating to the stored first postage indicium where the first postage indicium is determined to be suitable for use in relation to the second mail item.

8. Mail preparation apparatus, including:

an accounting unit operable to effect an accounting operation in respect of postage charges for mail items in a series of mail items, and generate postage indicia to provide evidence that accounting operations have been effected in respect of the postage charges;

wherein the accounting unit is configured to:

effect an accounting operation in respect of a first postage charge for a first mail item in a series of mail items, and generate a first postage indicium to provide evidence that the accounting operation has been effected in respect of the first postage charge; and in processing a second mail item comprising a mail item, subsequent to the first mail item, in the series of mail items, determine whether the first postage charge remains unused with the first postage charge remaining unused when processing of the first mail item has not been completed, and, where the first postage charge is unused, determine whether the first postage indicium is suitable for use in relation to the second mail item, and, where the first postage indicium is suitable for use in relation to the second mail item, generate a substitute postage indicium to provide evidence in relation to the second mail item that an accounting operation has been effected in respect of the first postage charge, with substitute postage indicium comprising the first postage indicium and an indicator therein indicative that the accounting operation for the first postage charge relates to the second mail item, and, where the first postage indicium is not suitable for use in relation to the second mail item, effect an accounting operation In respect of a second postage charge for the second mail item, and generate a second postage indicium to provide evidence that an accounting operation has been effected in respect of the second postage charge.

9. An apparatus as claimed in claim 8, wherein the substitute postage indicium includes a cryptographic token and the cryptographic token is based in part upon the indicator.

10. An apparatus as claimed in claim 8, wherein the first postage indicium is generated to include a flag in a first state, and the substitute postage indicium is generated with the flag in a second state different from the first state.

11. An apparatus as claimed in claim 10, wherein the substitute postage indicium includes a cryptographic token and the cryptographic token is based in part upon the state of the flag.

12. An apparatus as claimed in claim 8, wherein the First postage indicium is generated based at least in part on a recipient address, and the first postage indicium is determined to be suitable for use in relation to the second mail item where the recipient address of the second maid item is the same as the recipient address of the first mail item.

* * * * *